United States Patent
Cordts et al.

Patent Number: 5,228,827
Date of Patent: Jul. 20, 1993

[54] DEVICE FOR EVAPORATING FLUID LEAKAGE OF LIQUID COMPONENTS IN A SHAFT SEAL

[75] Inventors: Detlef Cordts, Mörlenbach; Frank Wagner, Wald-Michelbach, both of Fed. Rep. of Germany

[73] Assignee: Firma Carl Freudenberg, Weinheim/Bergstr., Fed. Rep. of Germany

[21] Appl. No.: 818,023

[22] Filed: Jan. 6, 1992

[30] Foreign Application Priority Data

Jan. 9, 1991 [DE] Fed. Rep. of Germany ....... 4100426

[51] Int. Cl.⁵ ............................................. F01D 11/00
[52] U.S. Cl. .................. 415/168.2; 415/168.1; 415/230; 415/113; 277/67; 277/DIG. 6; 277/70
[58] Field of Search ............... 415/170.1, 171.1, 113, 415/168.1, 168.2, 230; 277/26, 58, 67, 68, 133, DIG. 6, 70; 192/827

[56] References Cited

U.S. PATENT DOCUMENTS

| | | | |
|---|---|---|---|
| 1,763,574 | 6/1930 | Williams | 277/26 |
| 4,174,771 | 11/1979 | Hirt | 192/82 T |
| 4,393,012 | 7/1983 | Kato et al. | 261/39 A |
| 4,691,276 | 9/1987 | Miller et al. | 364/148 |
| 4,973,224 | 11/1990 | Pesch | 415/174.3 |

FOREIGN PATENT DOCUMENTS

| | | | |
|---|---|---|---|
| 2202840 | of 1972 | Fed. Rep. of Germany | |
| 2846240 | 7/1979 | Fed. Rep. of Germany | 415/113 |
| 1087698 | 4/1984 | U.S.S.R. | 415/171.1 |

OTHER PUBLICATIONS

Barunke, R. D.: Beheizbare Wellendichtung fün; eine Flüssig-Stickstoff-Kreiselpumpe: Linde Berichte aus Technik und Wissenshaft, 1967, vol. 24, pp. 20–25.

Primary Examiner—Edward K. Look
Assistant Examiner—Mark Sgantzos
Attorney, Agent, or Firm—Felfe & Lynch

[57] ABSTRACT

Device for the removal of liquid components issuing from a shaft seal into a cavity (3) enveloping a rotating shaft (1). A frictional heat source for the evaporation of the liquid components is associated with the cavity (3) and/or parts of the engine adjoining it.

20 Claims, 3 Drawing Sheets

DEVICE FOR EVAPORATING FLUID LEAKAGE OF LIQUID COMPONENTS IN A SHAFT SEAL

BACKGROUND OF THE INVENTION

The invention relates to a device for the removal of liquid components escaping from a frictional shaft seal in a cavity surrounding a rotating shaft, particularly in an automotive cooling water pump.

U.S. Pat. No. 4,973,224 discloses such a device as a component of a pump unit for liquid pumps. According to that patent, provision is made for removing liquid components escaping from a frictional shaft seal through a ventilation device in an annular chamber thus keeping them away from the adjacent components.

It is to be noted, however, that while the adjacent engine is in the warm-up phase, or in the case of short runs, such as for example short runs of motor vehicles, only comparatively low temperatures are produced, for example, in the cavity of a pump housing, so that remanent leakage fluids are not removed. The relatively high humidity that thus develops leads to corrosion of the adjacent components, along with a limitation of their reliability of operation and a shortening of useful life.

SUMMARY OF THE INVENTION

It is the object of the invention to remove all of the liquid components escaping from a frictional shaft seal and thus achieve an improved reliability of the operation of the device as well as a longer useful life.

Provision is made for the cavity and/or the engine parts adjacent thereto to be associated with a heat source for the evaporation of liquid components.

Increased leakage of frictional shaft seals occurs mostly when the temperatures of the adjacent engine parts are relatively low, so that evaporation of the liquid components escaping from the casing becomes difficult without an additional heat source. Increasing the rate of evaporation, especially when the engine is operating under unfavorable conditions, such as extremely short runs in which the engine does not reach the optimum operating temperature, is possible only through an external heat source.

Essentially there are two possible arrangements for such a heat source. Either the cavity into which the liquid escapes is permanently and uniformly heated and thus is kept at a temperature advantageous for evaporation, or the heat source is turned on only when there is a specific amount of liquid in the cavity. If the temperature is kept at a constant level by friction, this has the advantage that even very slight liquid losses which occur through the seal will be continuously evaporated away. If the heating of the cavity starts only when a certain amount of liquid has leaked and is present in the cavity, the average need for power to produce the heat is lower.

If the heat power P is produced by friction, coefficient of the friction $\mu$, the contact pressure $F_N$, the frictional radius of the bodies in contact $r_R$ and the angular velocity $\omega$ have an influence on the desired temperature. The relationship is expressed mathematically by the equation $P = \mu F_N r_R \omega$. If the parameters are properly established, the evaporation of about 1 gram of liquid per minute is possible.

According to an advantageous embodiment, provision is made such that the heat source consists of a first and a second friction disk, and that the first and the second friction disks can be brought in contact with one another. By virtue of a presser urging one of the friction disks axially against the other friction disk, an amount of heat is produced—substantially in proportion to the contact pressure—which results in the evaporation of the liquid situated in this space.

A spring can be associated with the second friction disk to provide for intimate contact with the pressing device. This arrangement assures a precise adjustment of the contact pressure between the two friction disks, so that, when the device is actuated, a precisely defined amount of heat will result. Moreover, casual contact between the friction disks is excluded. At the same time the spring can be disposed separately in the cavity, without joining it permanently to the second friction disk, or can be made integral with the latter. If the spring is made integral with the second friction disk, the advantage is that the assembly of the device is simplified, because the spring always assumes a set position in relation to the friction disk. Care must of course be taken that the spring be of a kind which will assure easy assembly and perfect operation of the device.

For example, the spring is constituted by at least one plate spring. Plate springs are very compact in the axial direction, so that overall small dimensions of the device in the axial direction are the result, combined with excellent operation. As an alternative, a body made from a foam of elastomeric material could be the spring means.

In one advantageous embodiment provision is made for the first friction disk to be disposed fixedly on the shaft, and for the second friction disk to be movable axially but affixed nonrotatably to a part of the engine adjoining the cavity, and configured as a housing. Installation of the device in an engine can therefore be done very simply.

The friction disks can have an L-shaped profile, enabling the device to be assembled easily and to be compact in the axial direction. Moreover, the friction disks for the evaporation of the liquid components have openings which can be provided with mesh-like inserts in order to protect the expander against wear during operation. The mesh-like inserts prevent the expander from penetrating through the openings in the relatively motionless friction disk as it expands properly in the axial direction and from being damaged by the rotating friction disk.

The presser can consist, for example, of an elastic swelling body. This swelling body, which can be such that it can expand only in the axial direction, thrusts on the one hand against an abutment and on the other against the friction disk biased by the spring means. The liquid that escapes from a shaft seal during operation produces an expansion of the swelling body in the axial direction. Depending on the amount of liquid and the swelling of the expanding body which it entails, the contact pressure of the second friction disk against the first is increased, so that additional heat is created in the cavity. The liquid evaporated by the heat is then removed to the exterior through vent bores in the housing.

The friction disks can also be urged together by a temperature responsive grow-expand element which thrusts against an abutment. If the grow-expand means is heated or cooled externally from the outside it produces a temperature in the cavity regardless of the amount of liquid to be evaporated. When a constant temperature is produced, such as the evaporation temperature of the medium being evaporated, liquid components that have entered the cavity evaporate very quickly. Furthermore, a construction is conceivable in which the friction disks are pressed by spring force against one another as long as the temperature in the cavity is below the evaporating temperature of the escaping liquid. When a temperature adapted to the particular application is reached, the two friction disks are separated from one another by a grow-expand means. This temperature is often and advantageously above the evaporation temperature of the escaping liquid, so that in any case the evaporation temperature is maintained in the cavity and very small amounts of liquid evaporate quickly.

The abutment can be configured as a frictional shaft seal and fixed in the housing. The housing can thus be arranged for easy installation of the device according to the invention and recesses or projections difficult to manufacture can be avoided. Moreover, the device is then directly adjacent to the point where the liquid leaks through.

The evaporated liquid escapes through ventilation openings provided in the housing.

DETAILED DESCRIPTION OF THE PREFERRED EMBODIMENTS

Figure 1:
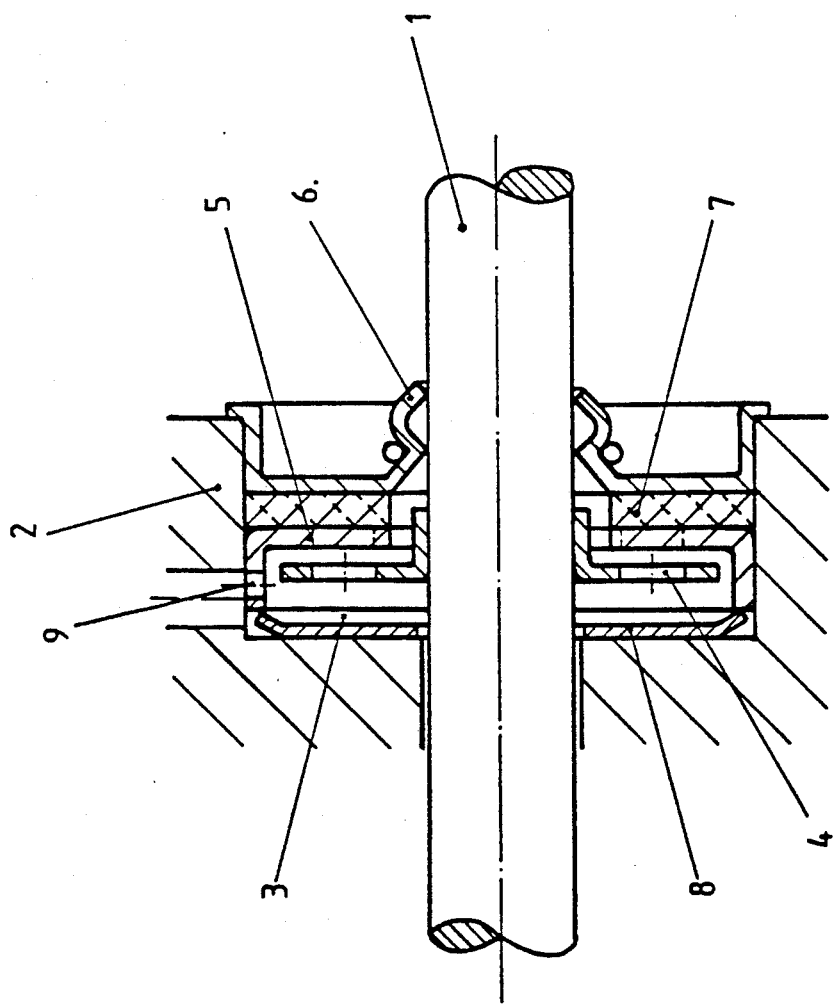
FIG. 1 is a section view of the device prior to engaging the friction disks.
Figure 2:
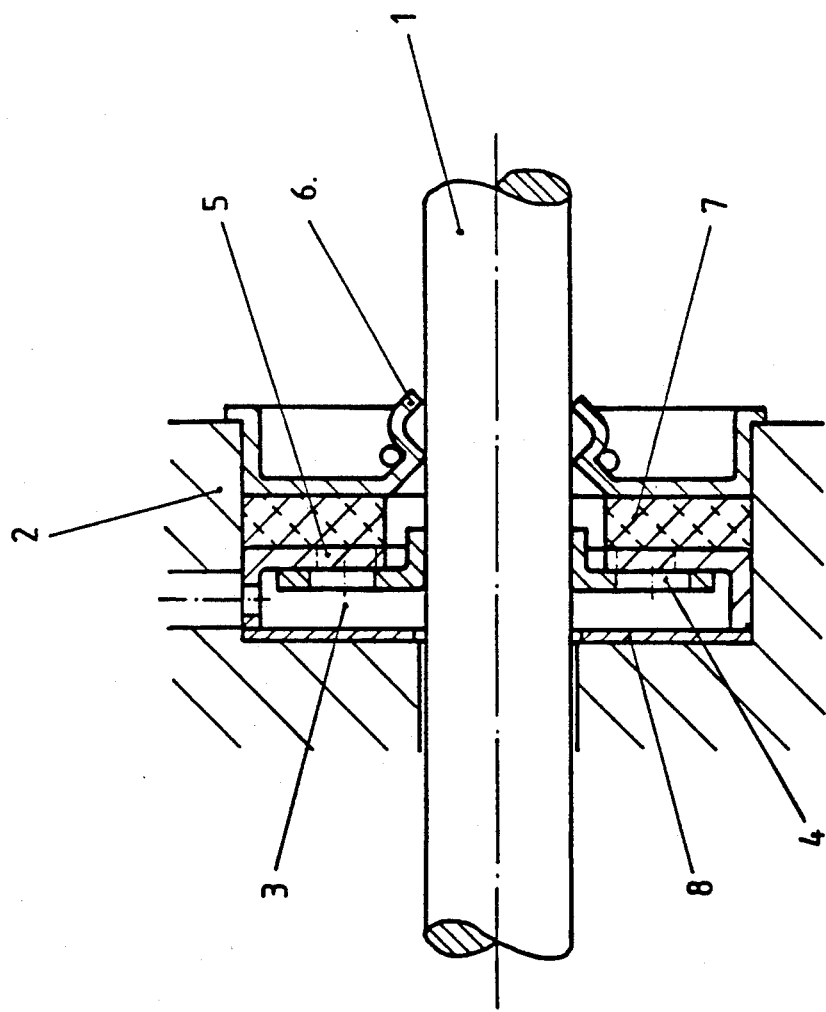
FIG. 2 is a section view of the device after engaging the friction disks.

In FIGS. 1 and 2 there is shown a device which includes essentially a cavity 3 encompassing a shaft 1 on which a first friction disk 4 is affixed. If the frictional shaft seal 6 seals the shaft 1 thoroughly against the cavity 3 so that no liquid enters the cavity 3, the swelling body 7 adjacent the seal in the axial direction and the second friction disk 5 held against the swelling body 7 by the plate spring 8 assume the positions shown in FIG. 1. Both the housing 2 and the frictional shaft seal 6 as well as the swelling body 7, the second friction disk 5 and the plate spring 8, do not rotate relative to one another. The shaft seal 6 forms the abutment fixedly arranged in the housing 2 for the swelling body 7 that can expand in the axial direction. The plate spring 8 urges the second friction disk 5 under bias against the swelling body 7 for the secure separation of the two friction disks 4 and 5.

In FIG. 2, liquid leaks, for example, through the joint between the shaft 1 and the shaft seal 6. At the same time the swelling body 7 expands axially and, using the shaft seal 6 as abutment, moves the second friction disk 5 against the resistance of the soft plate spring 8 into contact with the first friction disk affixed permanently on the shaft 1. Depending on the quality of the surface, the magnitude of the pressing force, the frictional radius of the bodies in frictional contact and the rotatory speed of housing 2 and/or shaft 1, the friction between the two friction disks 4 and 5 produces heat which evaporates the liquid that has leaked. The evaporated liquid can escape through a ventilation bore 9 in the housing.

Figure 3:
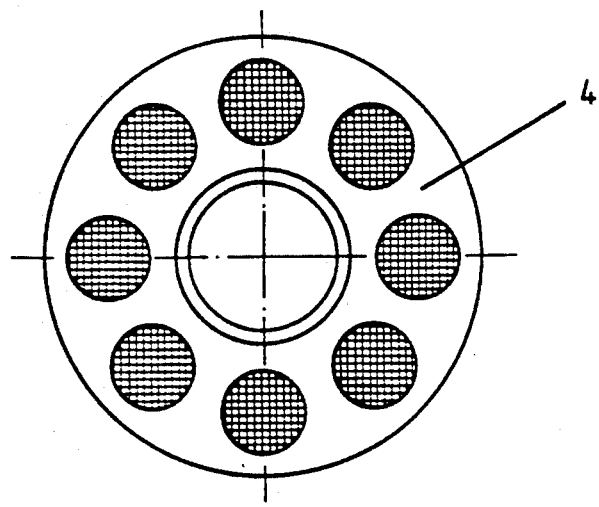
FIG. 3 is a plan view of the first friction disk.
Figure 4:
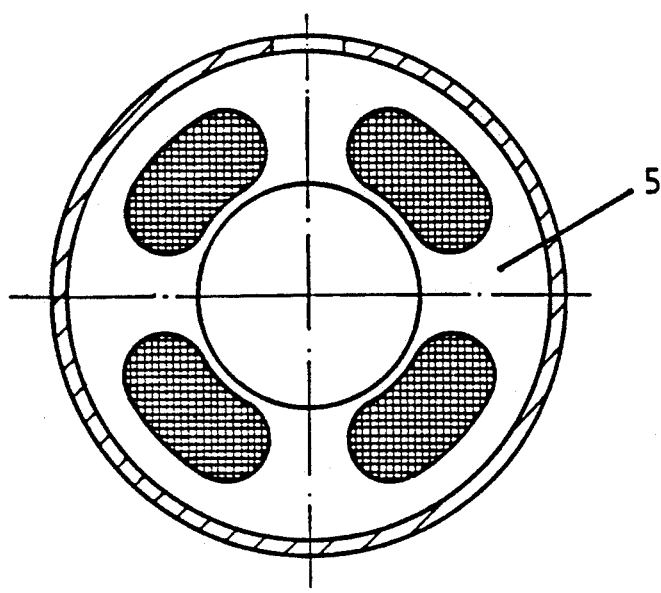
FIG. 4 is a plan view of the second friction disk.

In FIGS. 3 and 4 are shown the friction disks 4 and 5 which have openings provided with mesh inserts for the evaporation of the liquid components. This prevents the swelling body from bulging through the openings in the L-shaped friction disks in the case of proper expansion in the axial direction, and from being damaged there by the relatively moving friction disk 4.

Where the body 7 is a swelling body, it will have a sponge-like structure designed for axial expansion when a certain amount of liquid has been absorbed. The behavior of the body is matched to the factors of the application, e.g. amount of liquid leaking through the seal, dimensions of the device, and distance between discs. It can be a non-woven fabric containing a highly absorptive material which acquires a gel-like consistency as more liquid is absorbed. Where the body is temperature responsive, the evaporating temperature of the liquid is another factor to be considered.

We claim:

1. Device for removing liquid from a cavity surrounding a shaft rotatable about an axis in a housing, said device comprising
    a first friction disk in said cavity,
    a second friction disk in said cavity, said first and second disks being relatively rotatable upon rotation of said shaft,
    assisting means for urging said disks axially together until heat generated between said disks during rotation of said shaft evaporates liquid in said cavity.

2. Device as in claim 1 further comprising spring means for urging said disks apart.

3. Device as in claim 2 wherein said spring means comprises a plate spring which urges said second disk away from said first disk.

4. Device as in claim 1 wherein said first friction disk is fixed to said shaft and said second friction disk is fixed against rotation relative to said housing.

5. Device as in claim 1 wherein each of said disks has an L-shaped profile in radial section.

6. Device as in claim 1 further comprising an abutment fixed to said housing, said assisting means being disposed between said abutment and said second disk.

7. Device as in claim 6 wherein said abutment is a frictional ring seal about said shaft.

8. Device as in claim 6 wherein said assisting means comprises a swelling body which expands upon absorbing liquid in said cavity.

9. Device as in claim 1 further comprising ventilation means communicating with said cavity for releasing evaporated liquid from said cavity.

10. Device as in claim 4 wherein said second friction disk is axially movable toward said first friction disk.

11. Device as in claim 10 further comprising a frictional ring seal about said shaft isolating said cavity from a source of liquid.

12. Sealing arrangement for a rotating shaft, said arrangement comprising
    a housing having a cavity surrounding said shaft,
    a frictional ring seal about said shaft isolating said cavity from a source of liquid,
    a first friction disk in said cavity,
    a second friction disk in said cavity, said first and second friction disks being relatively rotatable upon rotation of said shaft,
    assisting means for urging said disks together so that heat generated between disks during rotation of said shaft evaporates liquid in said cavity, and
    ventilation means in said housing communicating with said cavity to remove evaporated liquid from said cavity.

13. Sealing arrangement as in claim 12 wherein said first friction disk is fixed to said shaft and said second friction disk is fixed against rotation relative to said housing.

14. Sealing arrangement as in claim 12 wherein said second friction disk is axially movable toward said first friction disk.

15. Sealing arrangement as in claim 12 wherein said assisting means urges said disks together in response to leakage of liquid through said shaft seal into said cavity.

16. Sealing arrangement as in claim 15 wherein said assisting means comprises a swelling body which expands upon absorbing liquid in said cavity.

17. Sealing arrangement as in claim 12 wherein said assisting means is disposed between said ring seal and said second friction disk.

18. Sealing arrangement as in claim 17 wherein said ring seal serves as an abutment for said assisting means.

19. Sealing arrangement as in claim 12 further comprising spring means for urging said disks apart.

20. Sealing arrangement as in claim 19 wherein said spring means comprises a plate spring which urges said second disk away from said first disk.

* * * * *